US010788184B2

(12) United States Patent
Mouri et al.

(10) Patent No.: US 10,788,184 B2
(45) Date of Patent: Sep. 29, 2020

(54) LIGHTING DEVICE FOR VEHICLE

(71) Applicant: TOYOTA JIDOSHA KABUSHIKI KAISHA, Toyota-shi (JP)

(72) Inventors: Fumihiko Mouri, Owariasahi (JP); Takuya Kitazono, Yokohama (JP); Norikatsu Myojin, Kawasaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/115,783

(22) Filed: Aug. 29, 2018

(65) Prior Publication Data

US 2019/0072253 A1 Mar. 7, 2019

(30) Foreign Application Priority Data

Sep. 4, 2017 (JP) ................................. 2017-169878

(51) Int. Cl.
*F21S 41/32* (2018.01)
*F21S 41/43* (2018.01)
(Continued)

(52) U.S. Cl.
CPC .............. *F21S 41/321* (2018.01); *B60Q 1/18* (2013.01); *F21S 41/148* (2018.01); *F21S 41/25* (2018.01);
(Continued)

(58) Field of Classification Search
CPC .......... F21S 41/40; F21S 41/43; F21S 41/435; F21S 43/40; F21S 43/26; F21S 41/255; F21S 41/657; F21S 41/25; F21S 41/365; F21S 41/321; F21S 41/148; B60Q 1/24; B60Q 1/46; B60Q 2300/45; B60Q 2400/50; B60Q 1/18; B60Q 1/02; F21Y 2115/10
See application file for complete search history.

(56) References Cited

U.S. PATENT DOCUMENTS 5,574,328 A * 11/1996 Okuchi ................ B60Q 1/0011
 313/114
7,341,367 B2 3/2008 Tsukamoto et al.
(Continued)

FOREIGN PATENT DOCUMENTS

DE 196 27 936 A1 1/1998
DE 10 2014 200 368 A1 7/2015
(Continued)

OTHER PUBLICATIONS

Extended European Search Report dated Jan. 24, 2019 in European Patent Application No. 18191516.6 citing documents AA-AC and AO-AQ therein, 7 pages.

*Primary Examiner* — Erin Kryukova
(74) *Attorney, Agent, or Firm* — Oblon, McClelland, Maier & Neustadt, L.L.P.

(57) ABSTRACT

A lighting device for a vehicle includes a light source that illuminates light, a reflecting surface, a shading member, and a projecting lens. The reflecting surface reflects the light illuminated from the light source and causes the light to converge. The shading member includes an aperture portion at which the light reflected and caused to converge by the reflecting surface is incident. Light that has passed through the aperture portion of the shading member is incident on the projecting lens, and the projecting lens emits the light toward a target.

8 Claims, 12 Drawing Sheets

(51) Int. Cl.
*F21S 41/148* (2018.01)
*F21S 41/255* (2018.01)
*B60Q 1/18* (2006.01)
*F21S 41/657* (2018.01)
*F21S 41/25* (2018.01)
*F21Y 115/10* (2016.01)
*F21S 41/365* (2018.01)
*B60Q 1/02* (2006.01)

(52) U.S. Cl.
CPC ............ *F21S 41/255* (2018.01); *F21S 41/43* (2018.01); *F21S 41/657* (2018.01); *B60Q 1/02* (2013.01); *B60Q 2300/45* (2013.01); *F21S 41/365* (2018.01); *F21Y 2115/10* (2016.08)

(56) References Cited

U.S. PATENT DOCUMENTS

| | | | |
|---|---|---|---|
| 2003/0072167 A1* | 4/2003 | Albou | B60Q 1/0041 362/543 |
| 2007/0025116 A1 | 2/2007 | Tsukamoto et al. | |
| 2007/0064438 A1 | 3/2007 | Ishida | |
| 2007/0133220 A1 | 6/2007 | Watanabe et al. | |
| 2009/0190323 A1* | 7/2009 | Watanabe | B60Q 1/143 362/37 |
| 2010/0073950 A1 | 3/2010 | Kawamura | |
| 2011/0170308 A1* | 7/2011 | Kinoshita | B60Q 1/076 362/516 |
| 2014/0328071 A1* | 11/2014 | Son | B60Q 1/346 362/464 |
| 2017/0276312 A1* | 9/2017 | Tanaka | B60Q 1/04 |
| 2017/0299139 A1* | 10/2017 | Masuda | F21S 41/43 |
| 2019/0113197 A1* | 4/2019 | Kamiya | F21S 41/00 |

FOREIGN PATENT DOCUMENTS

| | | |
|---|---|---|
| JP | 2007-287610 A | 11/2007 |
| JP | 2009-220631 | 10/2009 |
| WO | WO 2016/162611 A1 | 10/2016 |

* cited by examiner

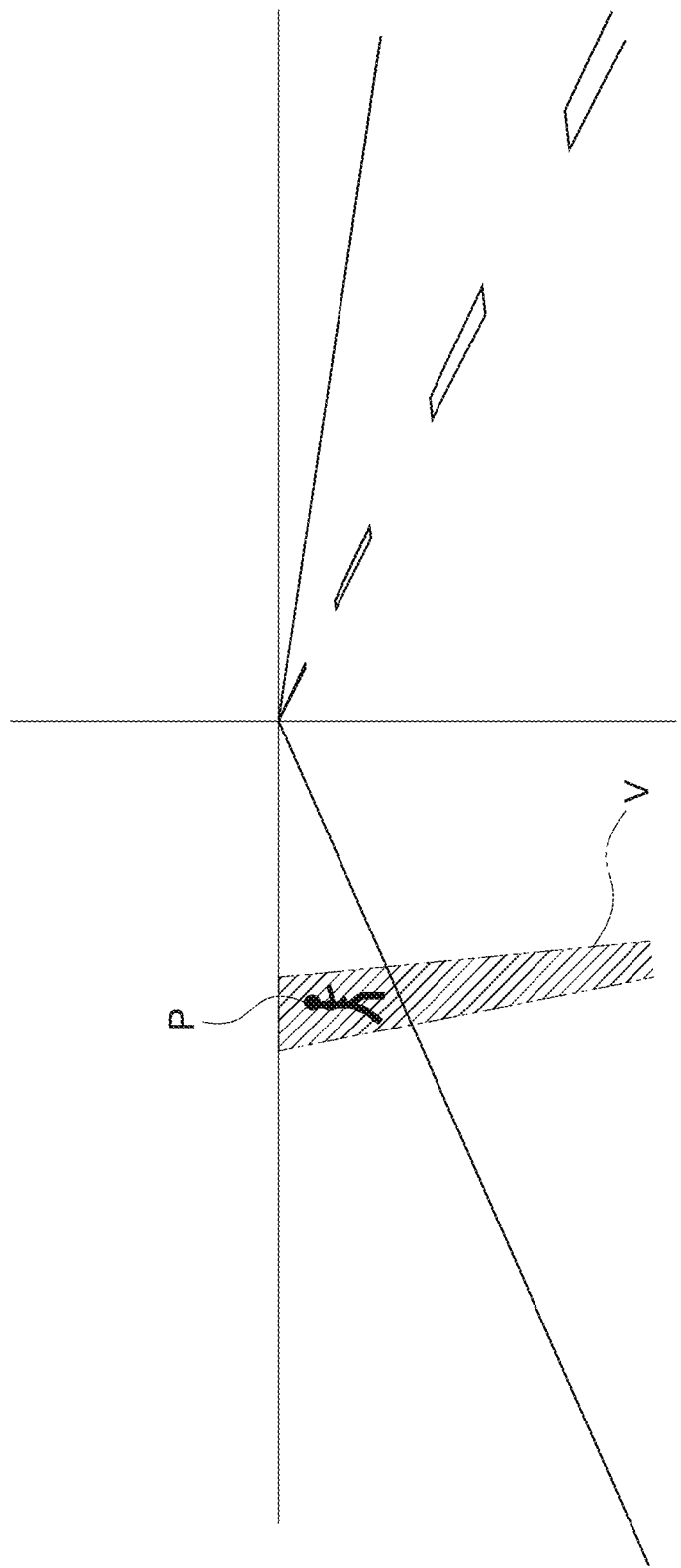

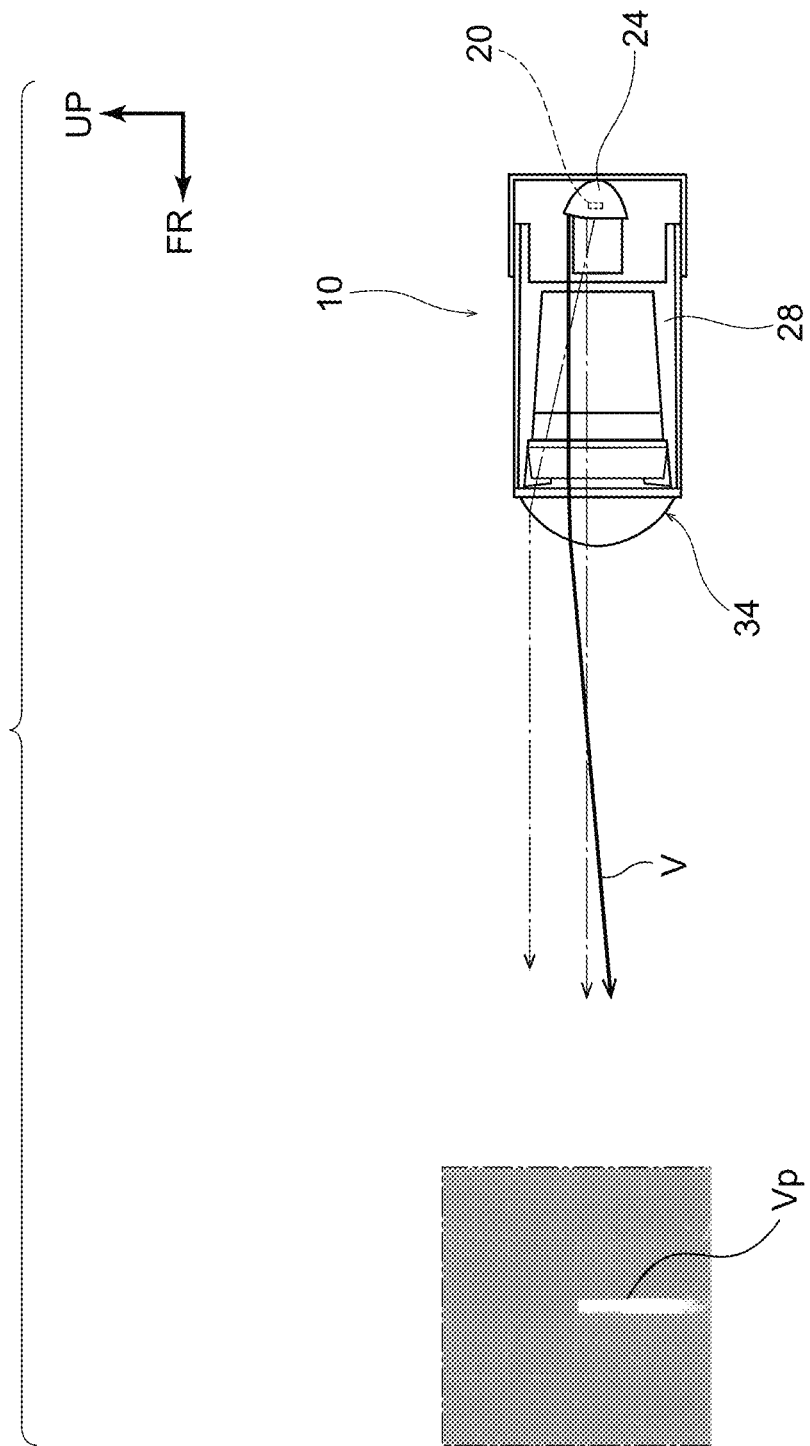

LIGHTING DEVICE FOR VEHICLE

CROSS-REFERENCE TO RELATED APPLICATION

This application is based on and claims priority under 35 USC 119 from Japanese Patent Application No. 2017-169878 filed on Sep. 4, 2017, the disclosure of which is incorporated by reference herein.

TECHNICAL FIELD

The present disclosure relates to a lighting device for a vehicle.

RELATED ART

Heretofore, a front lighting device for a vehicle has been proposed (for example, see Japanese Patent Application Laid-Open (JP-A) No. 2009-220631 (Patent Reference 1)) in which an illumination region of light illuminated from a light source is controlled by altering the position of a shading member such that the light is illuminated at a pedestrian walking at a roadside.

However, with a configuration in which an illumination region of light illuminated from a light source is controlled by altering the position of a shading member, it is difficult to converge the light on an aperture portion of the shading member, and losses of light caused by shading by the shading member may become large. Thus, a usage efficiency of the light illuminated from the light source may be lowered.

SUMMARY

Accordingly, an object of the present disclosure is to provide a lighting device for a vehicle that may improve a usage efficiency of light illuminated from a light source.

A lighting device for a vehicle according to a first aspect includes: a light source that illuminates light; a reflecting surface that reflects light illuminated from the light source and causes the light to converge; a shading member including an aperture portion at which the light reflected and caused to converge by the reflecting surface is made incident; and a projecting lens at which light that has passed through the aperture portion of the shading member is incident, the projecting lens emitting the light toward a target.

According to the first aspect, the light illuminated from the light source is reflected and converged by the reflecting surface, and is made incident on the aperture portion of the shading member. Therefore, the usage efficiency of the light illuminated from the light source is improved compared to a structure in which light that is illuminated from a light source and reflected by a reflecting surface is not converged on an aperture portion.

In a lighting device for a vehicle according to a second aspect, in the first aspect, the projecting lens includes plural focusing lenses.

According to the second aspect, the projecting lens is constituted by the plural focusing lenses. Therefore, the projecting lens illuminates the light onto a target more distinctly than if the projecting lens were constituted by a single lens.

In a lighting device for a vehicle according to a third aspect, in the lighting device for a vehicle according to any one of the first and second aspects, a light incidence direction downstream side of a peripheral edge portion structuring the aperture portion of the shading member is formed in an acute-angled shape in cross section.

According to the third aspect, the light incidence direction downstream side of the peripheral edge portion structuring the aperture portion of the shading member is formed in the acute-angled shape in cross section. Consequently, there is no risk of light that is reflected at a region opposing the peripheral edge portion being shaded by the peripheral edge portion, in contrast to a structure in which the light incidence direction downstream side of the peripheral edge portion is formed in a rectilinear shape in cross section. Thus, according to the third aspect, losses of light illuminated from the light source are suppressed further.

In a lighting device for a vehicle according to a fourth aspect, in the lighting device for a vehicle according to any one of the first to third aspects, the shading member is formed integrally with a holder that retains the projecting lens.

According to the fourth aspect, the shading member is formed integrally with the holder that retains the projecting lens. Therefore, in comparison with a structure in which the shading member is a separate body from a holder retaining the projecting lens, both a number of components is reduced and positional offsets between the projecting lens and the aperture portion of the shading member are suppressed.

In a lighting device for a vehicle according to a fifth aspect, the lighting device for a vehicle according to any one of the first to fourth aspects further includes: a recognition unit that recognizes the target; and an actuator that, on the basis of results of recognition by the recognition unit, controls the projecting lens such that the light emitted therefrom illuminates the target.

According to the fifth aspect, on the basis of results of recognition by the recognition unit, an actuator controls the projecting lens such that the light emitted therefrom illuminates the target. Therefore, the light is illuminated at the target more efficiently than in a configuration in which the recognition unit and the actuator are not provided.

According to the first aspect, the usage efficiency of light illuminated from the light source may be improved.

According to the second aspect, light may be illuminated at the target more distinctly.

According to the third aspect, losses of light illuminated from the light source may be suppressed further.

According to the fourth aspect, a number of components may be reduced, in addition to which positional offsets between the projecting lens and the aperture portion of the shading member may be suppressed.

According to the fifth aspect, the light may be illuminated at the target efficiently.

BRIEF DESCRIPTION OF DRAWINGS

FIG. 5 is a descriptive diagram showing a region that is illuminated with light by the lighting device for a vehicle according to the first exemplary embodiment.

FIG. 11 is a descriptive diagram showing light that is illuminated by a lighting device for a vehicle according to a third exemplary embodiment.

DETAILED DESCRIPTION

Figure 1:
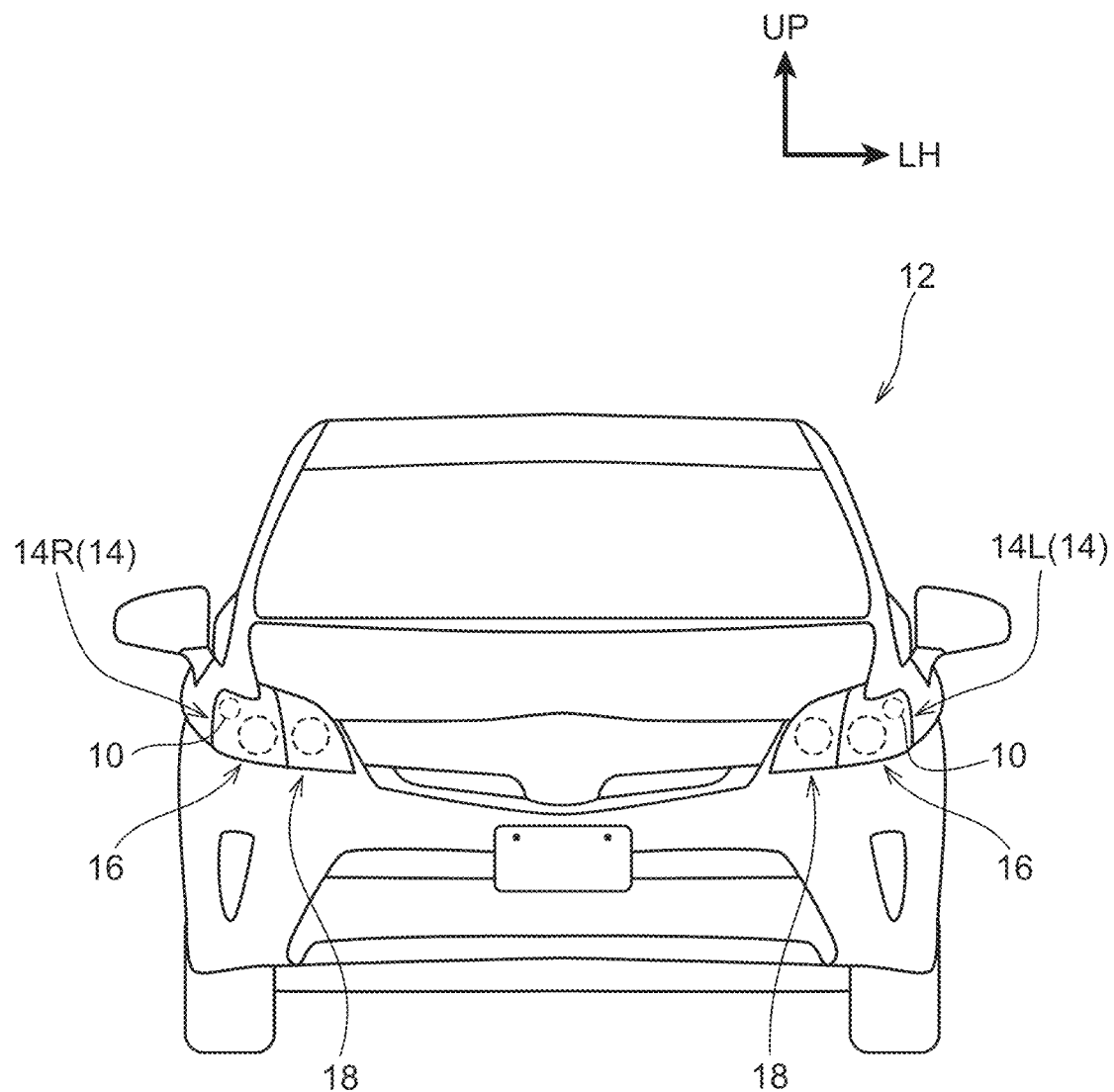
FIG. 1 is a front view showing a vehicle in which a lighting device for a vehicle according to a present exemplary embodiment is installed.

Herebelow, exemplary embodiments relating to the present disclosure are described in detail in accordance with the drawings. For convenience of description, the arrow UP that is shown where appropriate in the drawings indicates a vehicle upper direction, the arrow FR indicates a vehicle front direction, and the arrow LH indicates a vehicle left direction. Thus, in the following descriptions, where the directions up and down, front and rear, and left and right are recited without being particularly specified, the same represent up and down in the vehicle vertical direction, front and rear in the vehicle front-and-rear direction, and left and right in the vehicle left-and-right direction (the vehicle width direction).

As shown in FIG. 1, a vehicle 12 is equipped with a pair of headlamp units 14 at left and right, for assuring a field of view at the front side of the vehicle 12. That is, a headlamp unit 14R is disposed at a right side front end portion of the vehicle 12, and a headlamp unit 14L is disposed at a left side front end portion of the vehicle 12.

Each of the headlamp unit 14R and the headlamp unit 14L includes a low beam unit 16 that structures a vehicle width direction outer side portion thereof and a high beam unit 18 that structures a vehicle width direction inner side portion. The headlamp unit 14R and headlamp unit 14L are formed with left-right symmetry in the vehicle width direction.

The low beam unit 16 is structured so as to illuminate light (visible light) onto a low beam light distribution area of a road surface to the front side of the vehicle 12. The high beam unit 18 illuminates light (visible light) at a high beam light distribution area, which is diagonally to the upper-front side relative to the low beam light distribution area illuminated by the low beam unit 16. A lighting device for a vehicle 10 according to the present exemplary embodiments is provided at the vehicle width direction outer side of the low beam unit 16.

First Exemplary Embodiment

Figure 2:
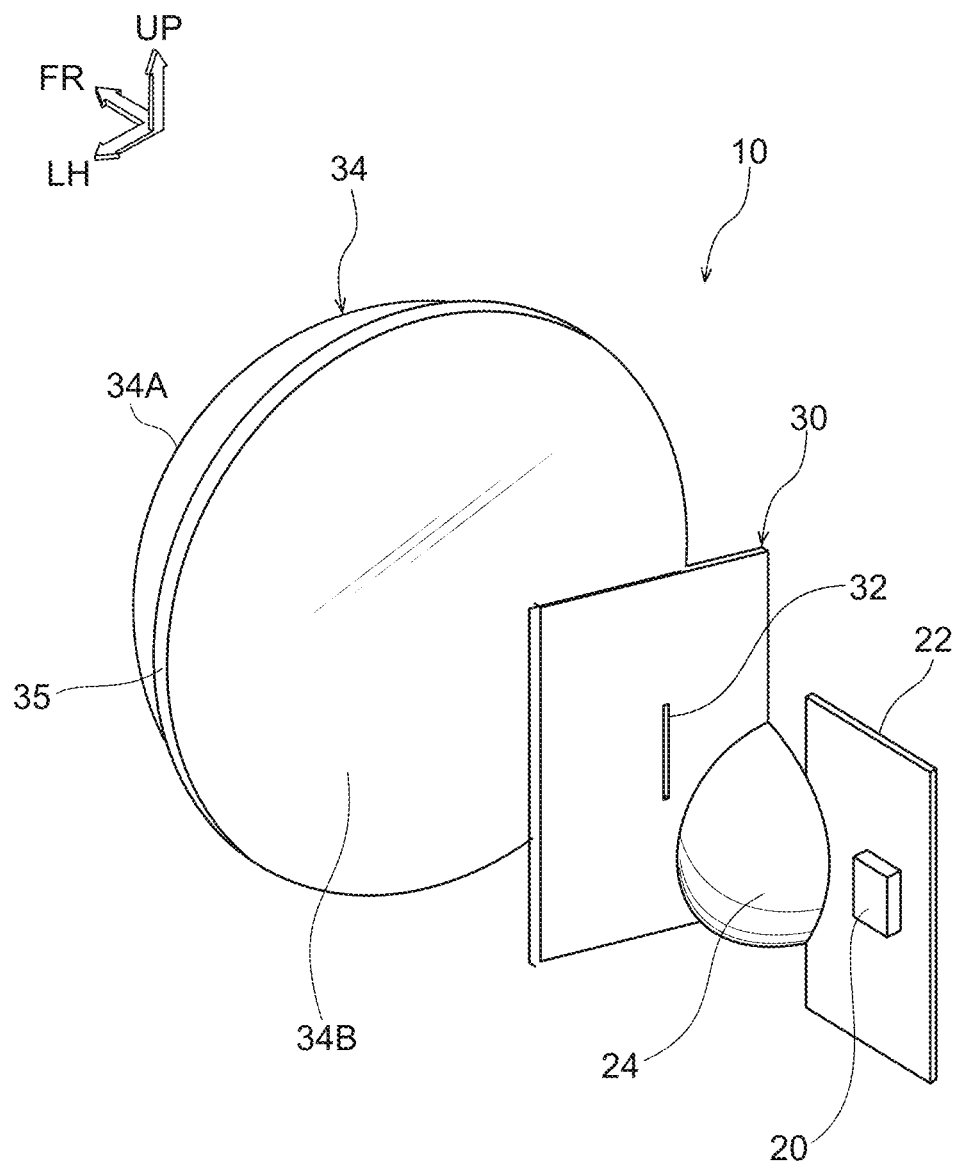
FIG. 2 is a perspective view showing schematic structure of the lighting device for a vehicle according to the first exemplary embodiment.
Figure 3:
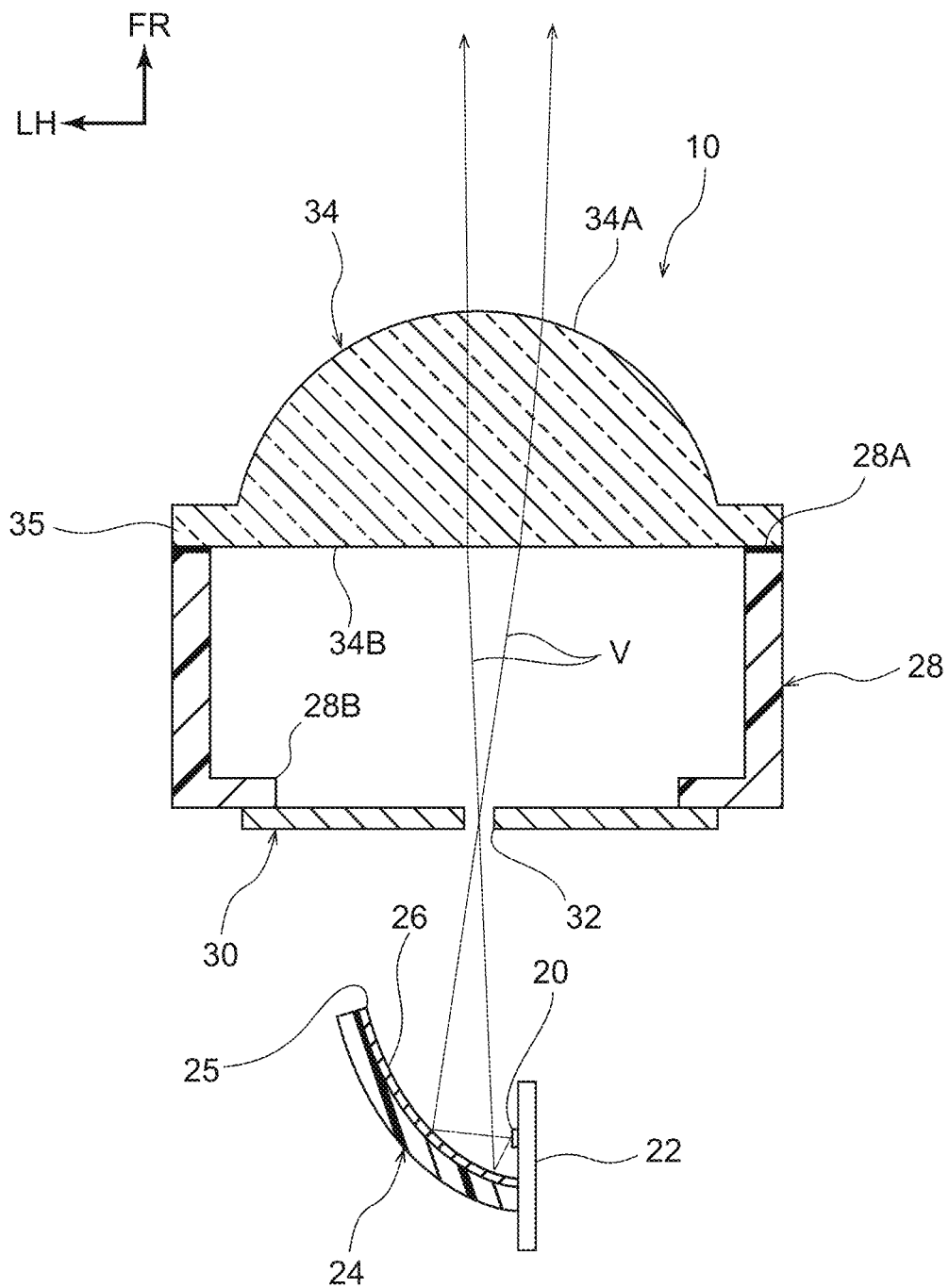
FIG. 3 is a plan sectional diagram showing the schematic structure of the lighting device for a vehicle according to the first exemplary embodiment.

First, the lighting device for a vehicle 10 according to a first exemplary embodiment is described. As shown in FIG. 2 and FIG. 3, the lighting device for a vehicle 10 is equipped with a light source 20 and a reflecting member 24. The light source 20 illuminates light (visible light). The reflecting member 24 includes a reflecting surface 26 with a concave surface shape that reflects the light illuminated from the light source 20 and causes the light to converge.

The lighting device for a vehicle 10 is also equipped with a shading member 30 and a projecting lens 34. The shading member 30 includes an aperture portion 32, at which the light reflected and converged by the reflecting surface 26 is incident. The projecting lens 34 emits light that has passed through the aperture portion 32 of the shading member 30 and is incident on the projecting lens 34 toward a target (for example, a pedestrian walking at a roadside, a bicycle running at a roadside or the like that is at risk of collision with the vehicle 12, which target is below referred to as "the pedestrian P"; see FIG. 5).

The light source 20 is a high-brightness light source such as a light-emitting diode (LED), a semiconductor laser (a laser diode (LD)) or the like. The light source 20 is provided on a circuit board 22 that is electronically connected with a control section 50 (see FIG. 4). The reflecting member 24 is integrally provided on the circuit board 22 at a rear portion thereof, at a predetermined inclination angle with respect to the circuit board 22 (in FIG. 2, the reflecting member 24 is depicted as being separated from the circuit board 22).

As shown in FIG. 3, the reflecting member 24 is formed in a curved surface shape that bulges toward the rear side. A reflecting mirror 25 with a mirror finish is provided at an inner face (front face) of the reflecting member 24. A surface (front face) of the reflecting mirror 25 serves as the reflecting surface 26. Thus, the reflecting member 24 of the present exemplary embodiment serves as a concave reflecting mirror (a reflector). The reflecting member 24 apart from the reflecting mirror 25 is fabricated of resin. Light V that is illuminated from the light source 20 is both reflected by the reflecting surface 26 and converged toward the aperture portion 32 of the shading member 30 by the reflecting surface 26.

In plan view and side view, a front face 34A of the projecting lens 34 is formed in a curved surface shape that bulges toward the front side, and a rear face 34B of the projecting lens 34 is formed in a planar surface shape. A protruding portion 35 that protrudes to the diametric direction outer side in a concentric circular shape is integrally formed (in the circumferential direction) along the whole circumference of the projecting lens 34 at a rear side periphery edge portion of the projecting lens 34. The protruding portion 35 is joined by laser welding to a front end portion (below referred to as a seat face) 28A of a holder 28. The holder 28 is formed in a substantially circular tube shape with an optical axis direction in the front-and-rear direction.

That is, the protruding portion 35 is adhered (welded) to the seat face 28A of the holder 28 by the protruding portion 35 being abutted against the seat face 28A of the holder 28, a laser beam (not shown in the drawings) illuminated from the front side passing through the protruding portion 35, and the laser beam fusing the seat face 28A of the holder 28. Hence, a front portion aperture of the holder 28 is closed off by the projecting lens 34. Note that the rear face 34B of the projecting lens 34 may be formed in a curved surface shape bulging toward the rear side.

The projecting lens 34 is configured such that light V that passes through the aperture portion 32 of the shading member 30 and is incident on the rear face 34B is made parallel by being transmitted from the rear face 34B to the front face 34A of the projecting lens 34, and is emitted from the front face 34A. Thus, light (visible light) V that is parallel light is emitted to the front side of the vehicle 12.

The shading member 30 is attached to a rear end portion of the holder 28. The shading member 30 is formed in a rectangular flat plate shape, the lengths of the diagonals of which are less than an internal diameter of the holder 28. An aperture 28B with a rectangular shape similar to that of the shading member 30 is formed at a rear end portion of the holder 28. That is, the rectangular-shaped aperture 28B of the holder 28 is closed off by the shading member 30.

The aperture portion 32 is formed in a slit shape whose length direction is in the vertical direction at a substantially central portion of the shading member 30. The light (visible light) V that has been reflected and converged by the reflecting surface 26 of the reflecting member 24 passes through the aperture portion 32, and the light (visible light) V that has passed through the aperture portion 32 is incident on the rear face 34B of the projecting lens 34.

Figure 4:
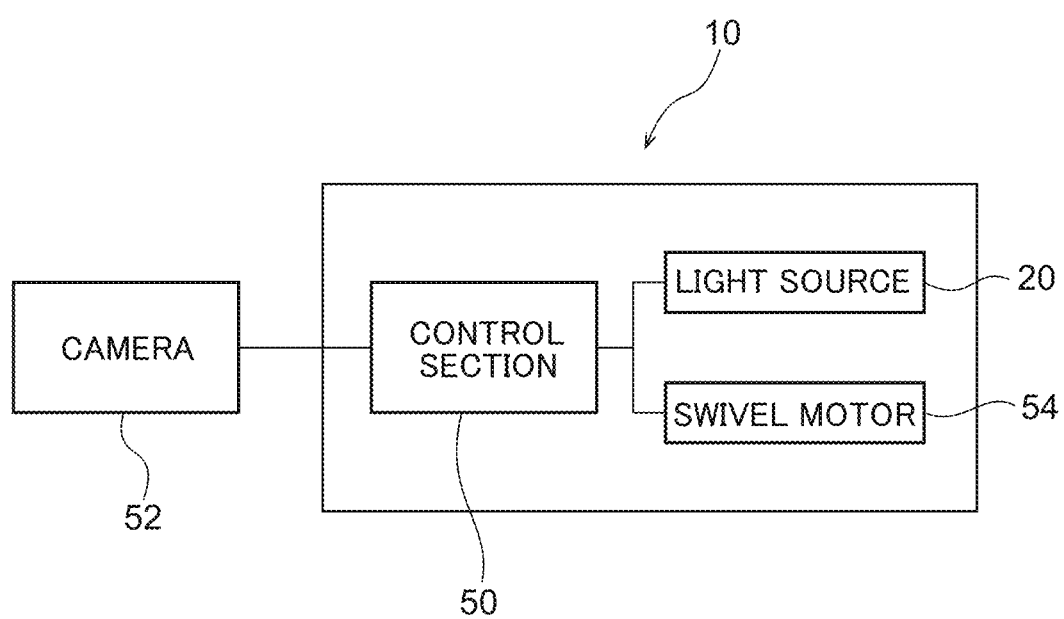
FIG. 4 is a block diagram showing schematic structure of the lighting device for a vehicle according to the first exemplary embodiment.

As shown in FIG. 4, the lighting device for a vehicle 10 includes a camera (including an image sensor) 52 and a swivel motor 54 that serves as an actuator. The camera 52 serves as a recognition unit that recognizes the pedestrian P as a target. On the basis of results of recognition by the camera 52, the swivel motor 54 controls an orientation of the projecting lens 34 such that the light (visible light) V emitted from the projecting lens 34 is illuminated at the pedestrian P.

The swivel motor 54 is provided at the lower side of the holder 28 and turns the holder 28, and thus the projecting lens 34, in a left-and-right direction about a rotation axis in the vertical direction. The light source 20, swivel motor 54 and camera 52 of the lighting device for a vehicle 10 are each electronically connected with the control section 50.

Thus, on the basis of results of detection (recognition) by the camera 52, the lighting device for a vehicle 10 may illuminate the light (visible light) V toward at least the legs of the pedestrian P who is (walking at the roadside) at risk of collision with the vehicle 12, by the control section 50 causing the light source 20 of the lighting device for a vehicle 10 to light up and driving the swivel motor 54 (turning the holder 28).

The following operations are described for the lighting device for a vehicle 10 according to the present exemplary embodiment with the structure described above.

During night-time running of the vehicle 12 (including situations in which the vehicle 12 is temporarily stopped at a traffic signal, a level crossing or the like), in a state in which at least the light source of the low beam unit 16 (not shown in the drawings) is lit up (a state in which light is illuminated at the low beam light distribution area at the front side of the vehicle 12), pedestrians P walking at the roadside are continuously imaged (detected) by the camera 52.

When a pedestrian P walking at, for example, a roadside at the left side of the progress direction of the vehicle 12, who is at risk of collision with the vehicle 12, is detected (recognized) by the camera 52, the control section 50 causes the light source 20 of the lighting device for a vehicle 10 to light up, controls the swivel motor 54, and turns the holder 28, and thus the projecting lens 34, in the leftward direction. As a result, as shown in FIG. 5, the light (visible light) V passing through the projecting lens 34 from the rear to the front is illuminated at the pedestrian P.

The light (visible light) V illuminated from the light source 20 is reflected and converged by the reflecting surface 26 of the reflecting member 24 and made incident on the aperture portion 32 of the shading member 30. Therefore, the light illuminated from the light source 20 may be made incident on the aperture portion 32 more efficiently than in a configuration in which light reflected by the reflecting surface 26 is not converged toward the aperture portion 32. In other words, a usage efficiency of the light that is illuminated from the light source 20 and made incident on the aperture portion 32 may be improved.

Because the swivel motor 54 is driven and turns the projecting lens 34 on the basis of results of detection (recognition) by the camera 52 and the light V is illuminated toward a pedestrian P who is at risk of collision with the vehicle 12, the light V may be illuminated at the pedestrian P efficiently (see FIG. 5). As a result, it is easier for a driver of the vehicle 12 to discern the pedestrian P who is at risk of collision with the vehicle 12.

Second Exemplary Embodiment

Now, the lighting device for a vehicle 10 according to a second exemplary embodiment is described. Portions that are the same as in the above-described first exemplary embodiment are assigned the same reference numerals and, as appropriate, are not described in detail.

Figure 6A:
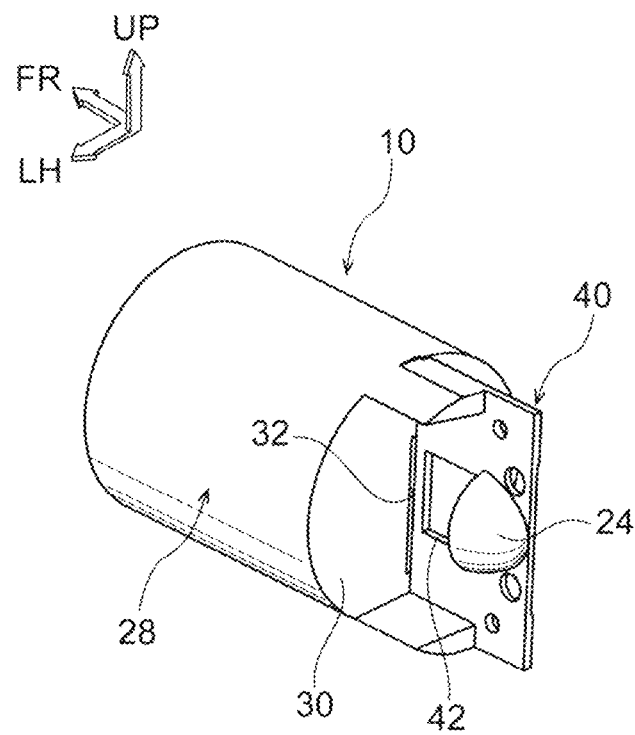
FIG. 6A is a perspective view showing a lighting device for a vehicle according to a second exemplary embodiment.
Figure 6B:
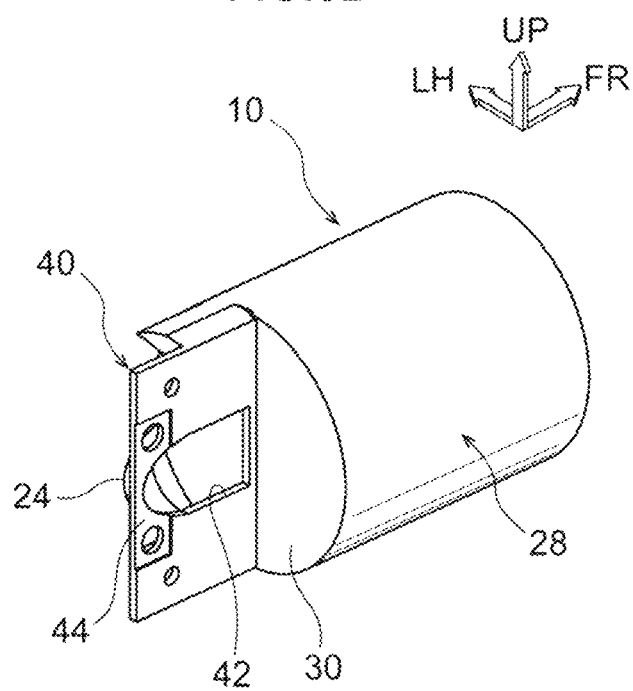
FIG. 6B is another perspective view showing the lighting device for a vehicle according to the second exemplary embodiment.
Figure 7:
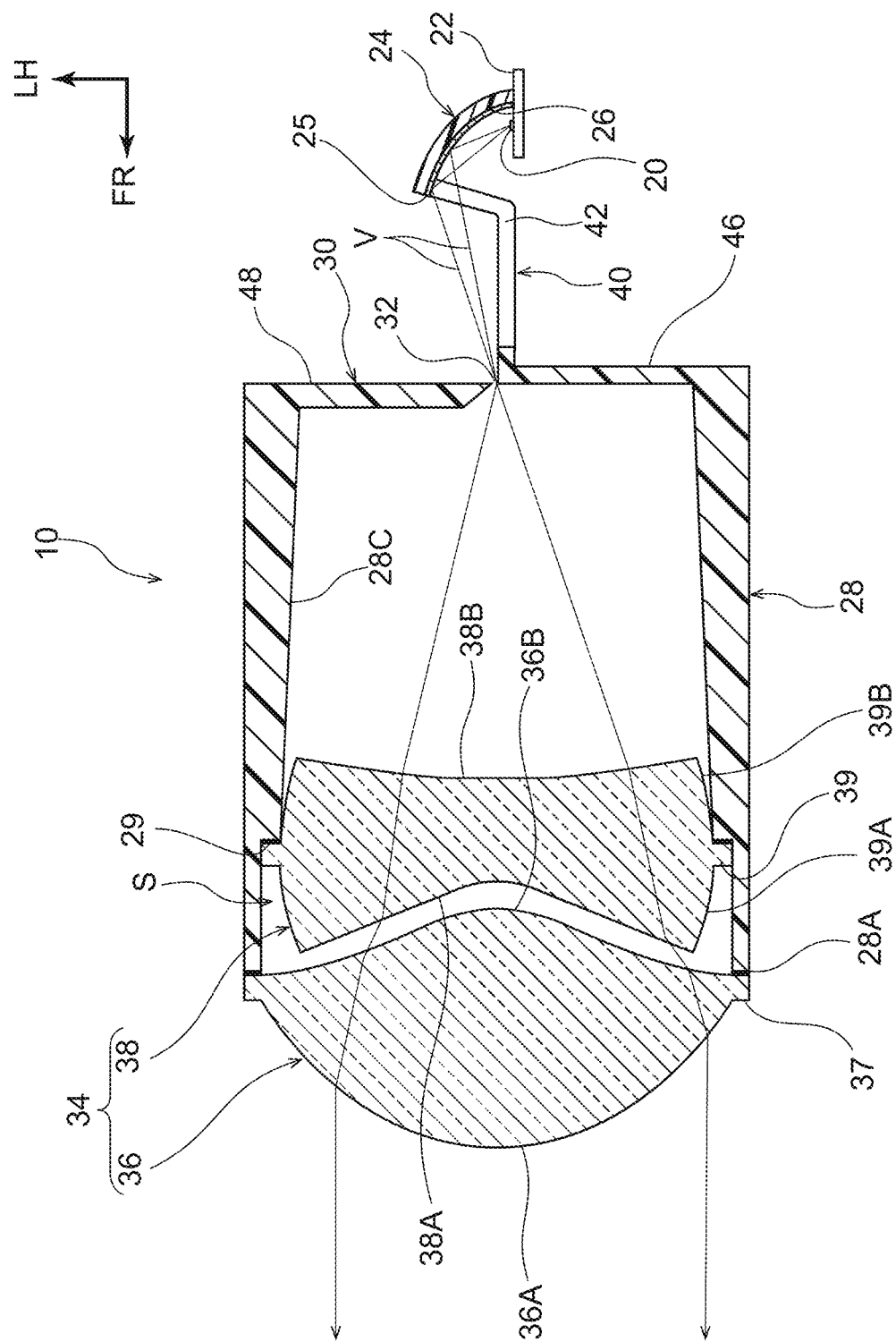
FIG. 7 is a bottom sectional diagram showing schematic structure of the lighting device for a vehicle according to the second exemplary embodiment.
Figure 9:
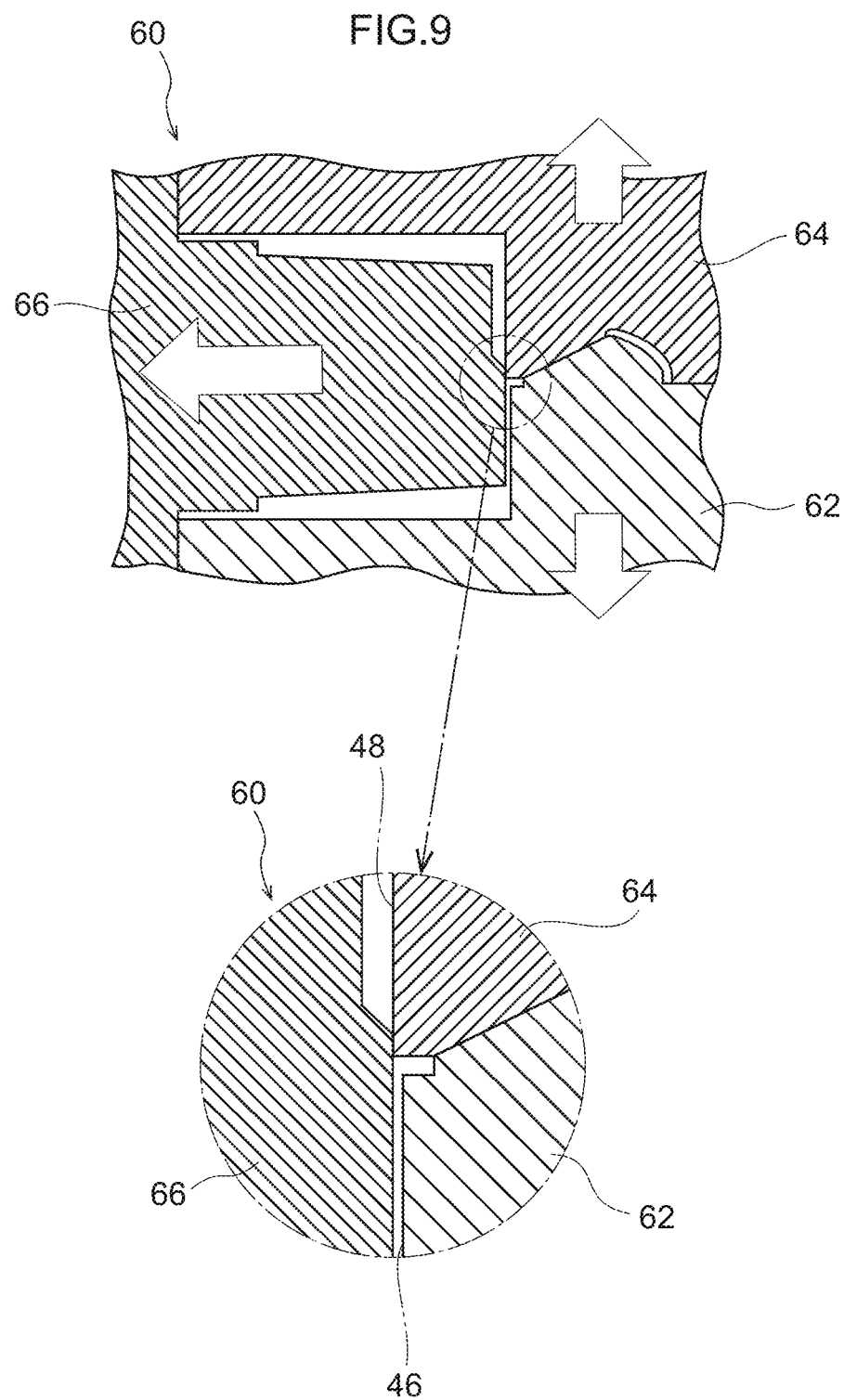
FIG. 9 is a sectional diagram showing a partial magnification of a mold that molds a holder of the lighting device for a vehicle according to the second exemplary embodiment.

As shown in FIG. 6A, FIG. 6B and FIG. 7, in the lighting device for a vehicle 10 according to the second exemplary embodiment, the shading member 30 and the reflecting member 24 are both formed integrally with a holder in a substantially tubular shape that has the optical axis direction in the front-and-rear direction. A mold 60 in which the holder 28 is injection-molded is shown in FIG. 9. As shown in FIG. 9, the mold 60 is structured by a fixed die 62, a movable die 64 and a slide 66.

As shown in FIG. 7, the projecting lens 34 is constituted by a plural number (two in this exemplary embodiment) of focusing lenses 36 and 38 that are arrayed in the optical axis direction and differ from one another in refractive index. To describe this more specifically, the focusing lens 36 at the front side has a greater diameter than the focusing lens 38 at the rear side. In plan view and side view, a front face 36A of the focusing lens 36 is formed in a curved surface shape that is convex to the front side, and a rear face 36B of the focusing lens 36 is formed in a curved surface shape that is convex to the rear side.

A protruding portion 37 that protrudes to the diametric direction outer side in a concentric circular shape is integrally formed (in the circumferential direction) along the whole circumference of the focusing lens 36 at a periphery edge portion of the focusing lens 36. The protruding portion 37 is joined by laser welding to the seat face 28A of the holder 28. That is, the protruding portion 37 is adhered to the seat face 28A of the holder 28 by the protruding portion 37 being abutted against the seat face 28A of the holder 28, a laser beam (not shown in the drawings) illuminated from the front side passing through the protruding portion 37, and the laser beam fusing the seat face 28A of the holder 28.

The focusing lens 38 at the rear side has a smaller diameter than the focusing lens 36 at the front side. In plan view and side view, a front face 38A of the focusing lens 38 is formed in a curved surface shape that is concave to the rear side, and a rear face 38B of the focusing lens 38 is formed in a curved surface shape that is concave to the front side. A protruding portion 39 that protrudes to the diametric direction outer side in a concentric circular shape is integrally formed (in the circumferential direction) along the whole circumference of the focusing lens 38 at a periphery edge portion of the focusing lens 38.

A step portion 29 is integrally formed (in the circumferential direction) along the whole circumference of the holder 28 at a front portion side of an inner periphery face 28C of the holder 28. The step portion 29 is formed such that a rear portion side of the inner periphery face 28C relative to a front portion side has a smaller internal diameter than the front portion side. The focusing lens 38 at the rear side is inserted into the holder 28 such that a rear face of the protruding portion 39 formed at the periphery edge portion thereof abuts against a front face of the step portion 29, and the protruding portion 39 is joined to the step portion 29 by laser welding.

A periphery edge portion 39A at the front side of the focusing lens 38 relative to the protruding portion 39 is formed in a tapered shape that narrows toward the front side. A space S is formed between the periphery edge portion 39A and the inner periphery face 28C of the holder 28. A laser beam (not shown in the drawings) illuminated from the front side through this space S passes through the protruding portion 39 and reaches the step portion 29. By fusing the step portion 29, the laser beam adheres the protruding portion 39 to the step portion 29.

A periphery edge portion 39B at the rear side of the focusing lens 38 relative to the protruding portion 39 is formed in a tapered shape that narrows toward the rear side. Thus, the focusing lens 38 is formed with a structure that is easy to insert into the holder 28. However, provided it is easy to insert the focusing lens 38 into the holder 28, a tapered shape that narrows toward the rear side need not be formed at the periphery edge portion 39B at the rear side of the focusing lens 38 relative to the protruding portion 39.

As is also shown in FIG. 6A, FIG. 6B and FIG. 7, a support portion 40 substantially in a flat plate shape extends to the rear side from one of length direction (vertical direction) peripheral edge portions that structure the aperture portion 32 of the shading member 30. In a side view seen in the vehicle width direction, the front side of the support portion 40 opens in a substantially rectangular shape, and an aperture portion 42 continues from this front side. The aperture portion 42 is formed in a substantially semicircular shape at the rear side of the support portion 40.

The reflecting member 24 protrudes integrally from a periphery edge portion of the region of the aperture portion 42 that opens in the substantially semicircular shape. A recessed portion 44 in a substantially rectangular shape (see FIG. 6B) is formed in a face at the opposite side of the support portion 40 from a face thereof at which the reflecting member 24 is provided. The recessed portion 44 is for attachment of the circuit board 22 including the light source 20 to the support portion 40.

As described above, the reflecting mirror 25 with a mirror finish is provided at the inner face of the reflecting member 24 according to the present exemplary embodiment. Thus, the reflecting member 24 serves as a concave reflecting mirror (a reflector). Apart from the reflecting mirror 25, the reflecting member 24 is formed integrally with the holder 28.

Figure 8:
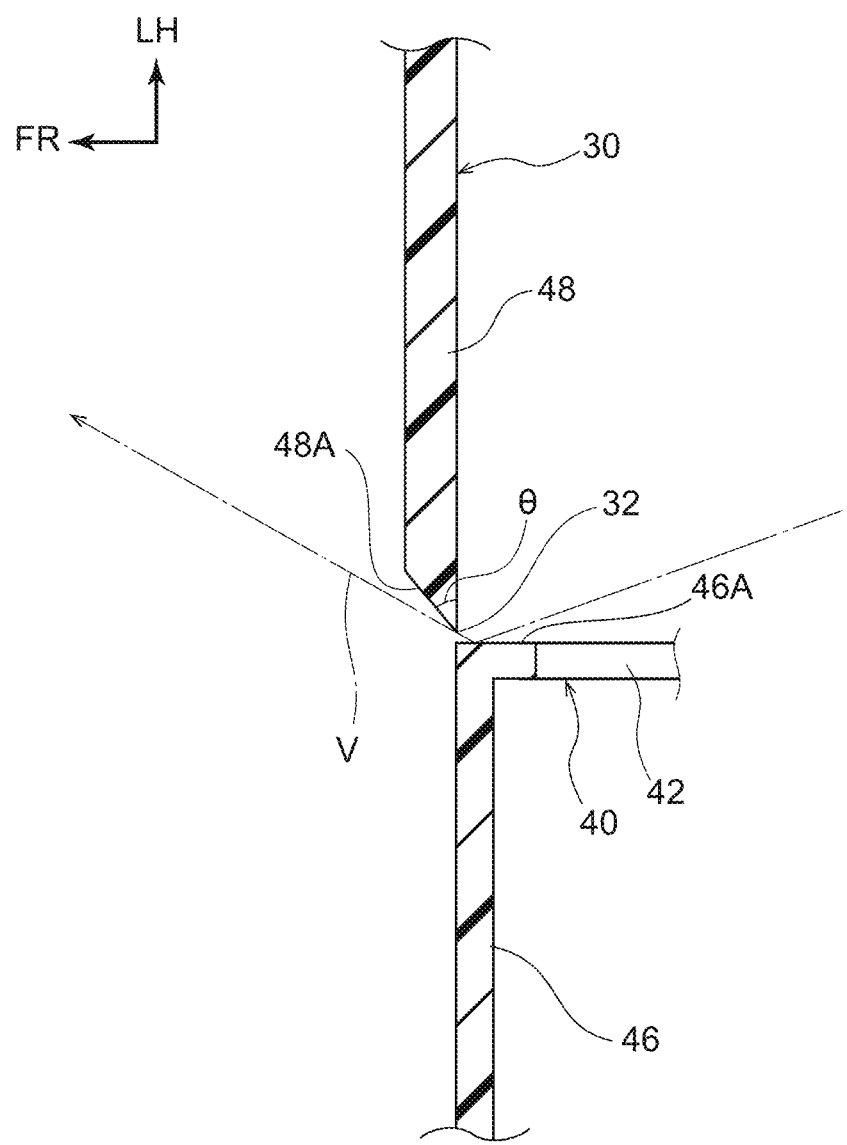
FIG. 8 is a sectional diagram showing an aperture portion of a shading member of the lighting device for a vehicle according to the second exemplary embodiment.

As shown in FIG. 7 to FIG. 9, the shading member 30 is formed integrally with the holder 28 such that a right side region of the shading member 30 in a bottom view (below referred to as a "right semicircular portion 46"), from which the support portion 40 protrudes, is disposed at the rear side relative to a left side region of the shading member 30 (below referred to as a "left semicircular portion 48"), from which the support portion 40 does not protrude. More specifically, the left semicircular portion 48 and right semicircular portion 46 are offset in the front-and-rear direction such that a rear face of the left semicircular portion 48 is coplanar with a front face of the right semicircular portion 46.

A light incidence direction downstream side of a peripheral edge portion at the side of the aperture portion 32 of the shading member 30 that is structured by the left semicircular portion 48 is formed in an acute-angled shape in a bottom sectional view (a plan sectional view). That is, in the bottom sectional diagram shown in FIG. 8, an end face 48A of this peripheral edge portion is formed at an acute angle such that an inclination angle $\theta$ of the end face 48A relative to the vehicle width direction is less than 90°.

The following operations are described for the lighting device for a vehicle 10 according to the second exemplary embodiment with the structure described above. Descriptions of operations that that are the same as operations according to the first exemplary embodiment are omitted as appropriate.

During night-time running of the vehicle 12 (including situations in which the vehicle 12 is temporarily stopped at a traffic signal, a level crossing or the like), in a state in which at least the light source of the low beam unit 16 (not shown in the drawings) is lit up (a state in which light is illuminated at the low beam light distribution area at the front side of the vehicle 12), pedestrians P walking at the roadside are continuously imaged (detected) by the camera 52.

When a pedestrian P walking at, for example, a roadside at the left side of the progress direction of the vehicle 12, who is at risk of collision with the vehicle 12, is detected (recognized) by the camera 52, the control section 50 causes the light source 20 of the lighting device for a vehicle 10 to light up, controls the swivel motor 54, and turns the holder 28, and thus the projecting lens 34 (the focusing lenses 36 and 38), in the leftward direction. As a result, as shown in FIG. 5, the light (visible light) V passing through the projecting lens 34 (the focusing lenses 36 and 38) from the rear to the front is illuminated at the pedestrian P.

The light (visible light) V illuminated from the light source 20 is reflected and converged by the reflecting surface 26 of the reflecting member 24 and made incident on the aperture portion 32 of the shading member 30. Therefore, the light illuminated from the light source 20 may be made incident on the aperture portion 32 more efficiently than in a configuration in which light reflected by the reflecting surface 26 is not converged toward the aperture portion 32. In other words, a usage efficiency of the light that is illuminated from the light source 20 and made incident on the aperture portion 32 may be improved.

Because the swivel motor 54 is driven and turns the projecting lens 34 (the focusing lenses 36 and 38) on the basis of results of recognition by the camera 52, and the light V is illuminated toward a pedestrian P who is at risk of collision with the vehicle 12, the light V may be illuminated at the pedestrian P efficiently (see FIG. 5).

Furthermore, because the projecting lens 34 is constituted by the focusing lenses 36 and 38 that differ in refractive index from one another, the light may be illuminated at the pedestrian P more distinctly (with chromatic aberration being corrected and color separation at the light-dark boundary of the light distribution pattern being suppressed) than in a configuration in which the projecting lens 34 is structured by a single lens. Therefore, it is easier for a driver of the vehicle 12 to discern the pedestrian P who is at risk of collision with the vehicle 12.

Figure 12A:
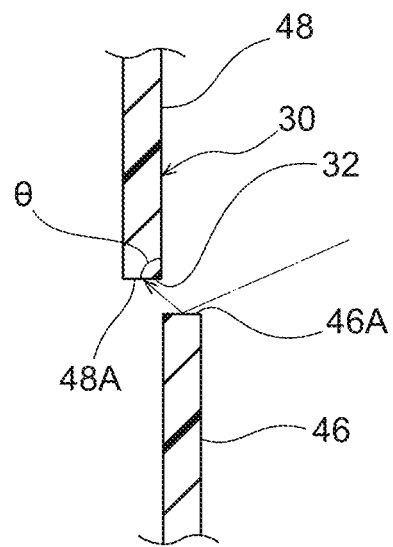
FIG. 12A is a sectional diagram showing an aperture portion of a shading member according to a comparative example.

As shown in FIG. 12A, if the end face 48A of the peripheral edge portion at the side of the aperture portion 32 that is structured by the left semicircular portion 48 were formed at a right angle with respect to the vehicle width direction (θ=90°), then of the light that is incident on the aperture portion 32, light that is reflected from an end face 46A of the right semicircular portion 46 would strike the end face 48A of the left semicircular portion 48 and might be blocked or might be reflected in an unintended direction. Thus, with this structure, the usage efficiency of the light illuminated from the light source 20 and made incident on the aperture portion 32 might be reduced (there might be losses of light).

In contrast, in the shading member 30 according to the present exemplary embodiment as shown in FIG. 8, the inclination angle θ with respect to the vehicle width direction of the end face 48A of the peripheral edge portion at the side of the aperture portion 32 that is structured by the left semicircular portion 48 is an acute angle (θ<90°). Therefore, of the light that is made incident on the aperture portion 32, cases of light reflected from the end face 46A of the right semicircular portion 46 striking and being blocked by the end face 48A of the left semicircular portion 48 (light being lost) may be suppressed or prevented. As a result, the usage efficiency of the light illuminated from the light source 20 and made incident on the aperture portion 32 may be further improved.

Figure 12B:
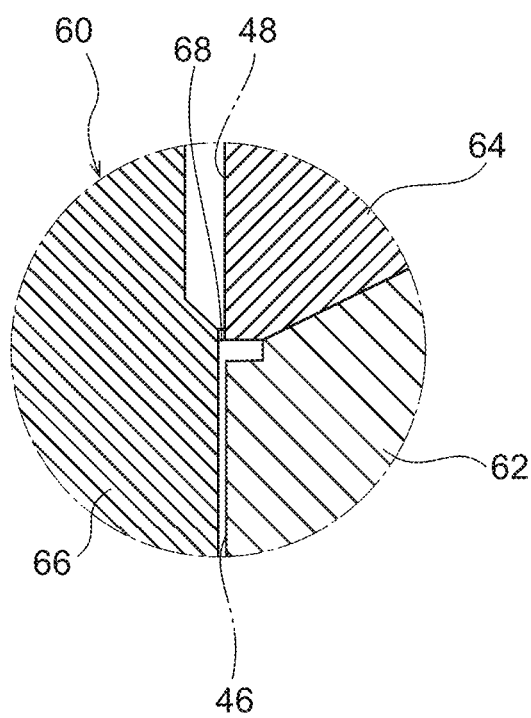
FIG. 12B is a sectional diagram showing a partial magnification of a mold that molds a holder according to the comparative example.

As shown in FIG. 8 and FIG. 9, the left semicircular portion 48 and right semicircular portion 46 of the shading member 30 according to the present exemplary embodiment are offset in the front-and-rear direction such that the rear face of the left semicircular portion 48 is coplanar with the front face of the right semicircular portion 46. Therefore, in contrast to a configuration in which the shading member 30 (the holder 28) is molded by the mold 60 such that the rear face of the left semicircular portion 48 is coplanar with the rear face of the right semicircular portion 46, there is no need to form a small protrusion shape (a protrusion portion 68) in the mold 60 as shown in FIG. 12B. As a result, durability of the mold 60 may be improved.

Because the shading member 30 and the reflecting member 24 are formed integrally with the holder 28, compared to a configuration in which the shading member 30 and the reflecting member 24 are respectively separate bodies and are attached to the holder 28, a number of components may be reduced, in addition to which mountability of the shading member 30 (the aperture portion 32) and the reflecting member 24 (the reflecting surface 26) to the holder 28 (the projecting lens 34) is better, and positional offsets therebetween may be suppressed.

The protruding portion 39 of the focusing lens 38 at the rear side, which constitutes the projecting lens 34 together with the focusing lens 36 at the front side, is joined by laser welding to the step portion 29 formed at the inner periphery face 28C of the holder 28 in a similar manner to the protruding portion 37 of the focusing lens 36 at the front side. Therefore, positional accuracy of the focusing lens 38 at the rear side with respect to the focusing lens 36 at the front side may be improved.

Third Exemplary Embodiment

Finally, the lighting device for a vehicle 10 according to a third exemplary embodiment is described. Portions that are the same as in the above-described first exemplary embodiment and second exemplary embodiment are assigned the same reference numerals and, as appropriate, are not described in detail (including operations that are the same).

As shown in FIG. 11, the third exemplary embodiment differs from the second exemplary embodiment described above only in that the concave surface shape of the reflecting mirror 25 (the reflecting surface 26) provided at the reflecting member 24 is a freeform curved surface. The meaning of the term "freeform curved surface" as used here is intended to exclude curved surfaces that may be represented by simple expressions, such as the surface of a sphere, and to include curved surfaces expressed by higher-order expressions applied in 3D graphics, which represent curved surfaces that cannot be expressed by simple expressions.

Figure 10:
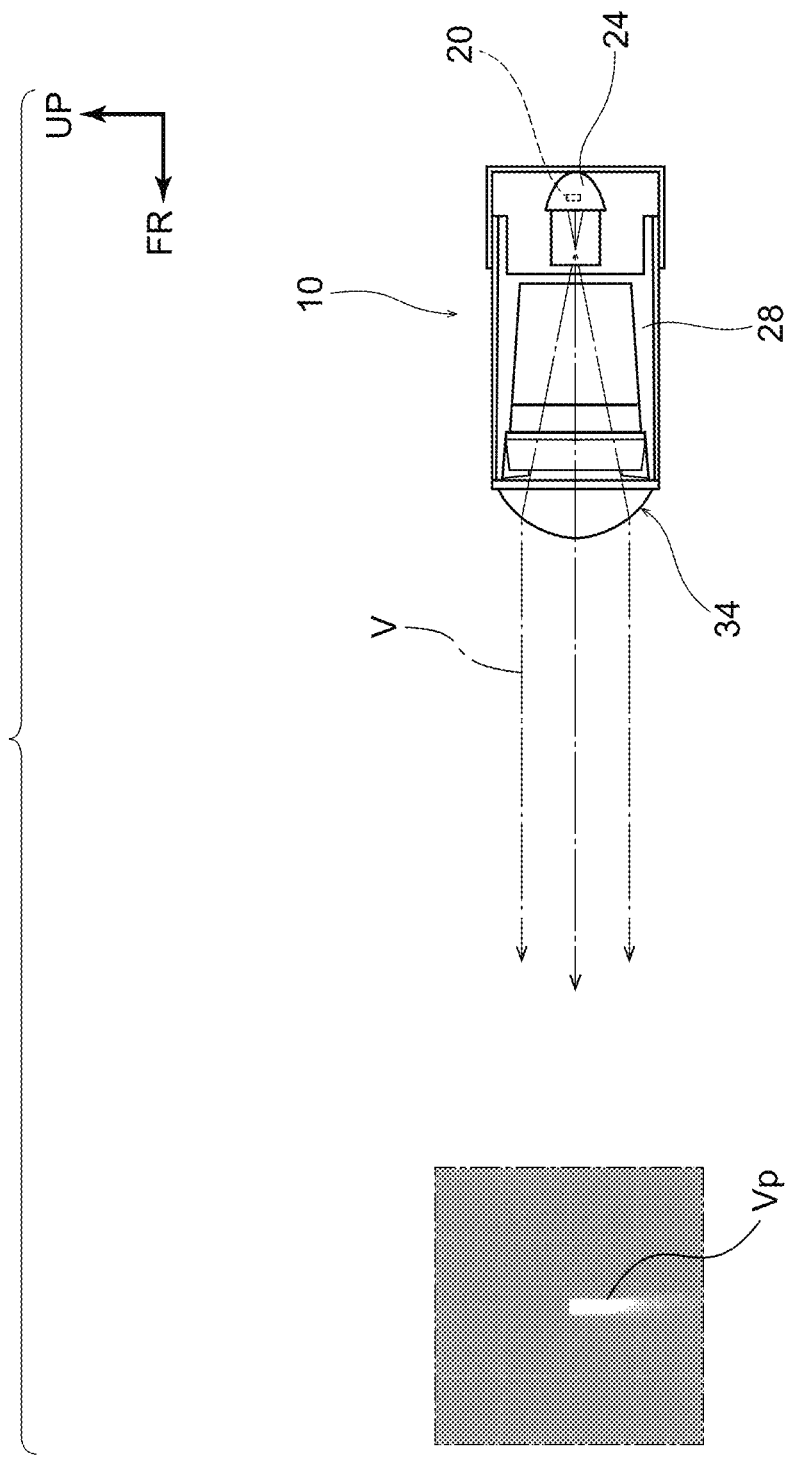
FIG. 10 is a descriptive diagram showing light that is illuminated by the lighting device for a vehicle according to the second embodiment.

When the light illuminated from the light source 20 is reflected by the reflecting surface 26 that is formed as a freeform curved surface, the light V is incident on the aperture portion 32 as light that is parallel over the vertical direction, without a focusing point. Consequently, illuminated light Vp that is illustrated in FIG. 11 is illuminated light that is more uniform in the vertical direction than the illuminated light Vp illustrated in FIG. 10.

That is, the lighting device for a vehicle 10 according to the third exemplary embodiment may improve the usage efficiency of the light (visible light) V illuminated from the light source 20 compared to the lighting device for a vehicle 10 according to the second exemplary embodiment. To describe this specifically using a numerical example, if the usage efficiency of light in the second exemplary embodiment is found to be 15.91%, the usage efficiency of light in the third exemplary embodiment is found to be 22.35%. Thus, the usage efficiency of light in the third exemplary embodiment is improved by approximately 40% compared to the second exemplary embodiment.

Hereabove, the lighting device for a vehicle 10 according to the present exemplary embodiments is described by reference to the drawings. However, the lighting device for a vehicle 10 according to the present exemplary embodiments is not limited to the configurations shown in the drawings; suitable design modifications may be applied within a scope not departing from the gist of the present disclosure. For example, in the lighting device for a vehicle 10 according to the present exemplary embodiments, the low beam unit 16 and the high beam unit 18 may be unified.

In the second exemplary embodiment and the third exemplary embodiment, it is sufficient if the projecting lens 34 is constituted by a plural number of focusing lenses; the mode shown in the drawings in which the projecting lens 34 is constituted by the two focusing lenses 36 and 38 is not limiting. Furthermore, the shapes of the focusing lens 36 and focusing lens 38 constituting the projecting lens 34 are not limited to the respective shapes shown in the drawings.

What is claimed is:
1. A lighting device for a vehicle, comprising:
a light source that illuminates light;
a reflecting surface that reflects light illuminated from the light source and causes the light to converge;
a shading member including an aperture portion at which the light reflected and caused to converge by the reflecting surface is made incident; and
a projecting lens at which light that has passed through the aperture portion of the shading member is incident, the projecting lens emitting the light toward a target, wherein the aperture portion has a cross-sectional shape that tapers off on a light incidence downstream side of the aperture portion towards where the light is made incident, the shading member includes a first portion and a second portion, each of which has a substantially semi-circular shape when viewed along an optical axis direction of the lighting device, and the first portion is offset relative to the second portion in the optical axis direction such that a rear face of the first portion is coplanar with a front face of the second portion.

2. The lighting device for a vehicle according to claim 1, wherein the projecting lens comprises a plurality of focusing lenses.

3. The lighting device for a vehicle according to claim 2, wherein the shading member is formed integrally with a holder that retains the projecting lens.

4. The lighting device for a vehicle according to claim 2, further comprising:

a recognition unit that recognizes the target; and an actuator that, on the basis of results of recognition by the recognition unit, controls the projecting lens such that the light emitted therefrom illuminates the target.

5. The lighting device for a vehicle according to claim 1, wherein the shading member is formed integrally with a holder that retains the projecting lens.

6. The lighting device for a vehicle according to claim 1, further comprising:

a recognition unit that recognizes the target; and an actuator that, on the basis of results of recognition by the recognition unit, controls the projecting lens such that the light emitted therefrom illuminates the target.

7. The lighting device for a vehicle according to claim 1, further comprising:

a support portion that includes the light source and the reflecting surface, wherein the support portion extends from a front face of the first portion.

8. The lighting device for a vehicle according to claim 7, wherein the aperture portion is between the first portion and the second portion.

* * * * *